June 12, 1945. D. W. SHERMAN 2,377,974

METHOD OF UPSETTING CHANNEL EDGES FOR WELDING

Filed April 25, 1942

Donald W. Sherman
INVENTOR.

BY *Edwin C. Andrus*
ATTORNEY.

Patented June 12, 1945

2,377,974

UNITED STATES PATENT OFFICE 2,377,974

METHOD OF UPSETTING CHANNEL EDGES FOR WELDING

Donald W. Sherman, Shorewood, Wis., assignor to A. O. Smith Corporation, Milwaukee, Wis., a corporation of New York Application April 25, 1942, Serial No. 440,436

4 Claims. (Cl. 78—81)

This invention relates to a method of upsetting the edge of a channel member to prepare the member for welding.

The principal object of the present invention is to provide a method of making the edge of a channel member thicker than the body portion of such member.

Another object is to provide a method of beveling the edge of a channel member to prepare the member for welding.

Other objects will appear from the following description of an embodiment of the invention illustrated in the accompanying drawing.

Figure 1:
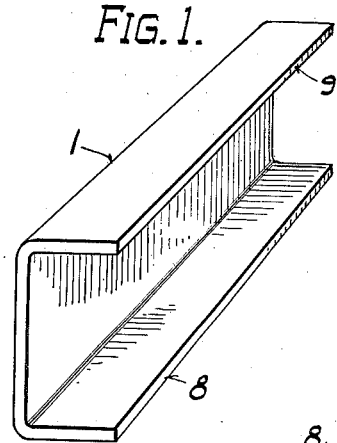
Figure 1 is a perspective view of a channel member whose edges are to be upset in accordance with the method of this invention.
Figure 2:
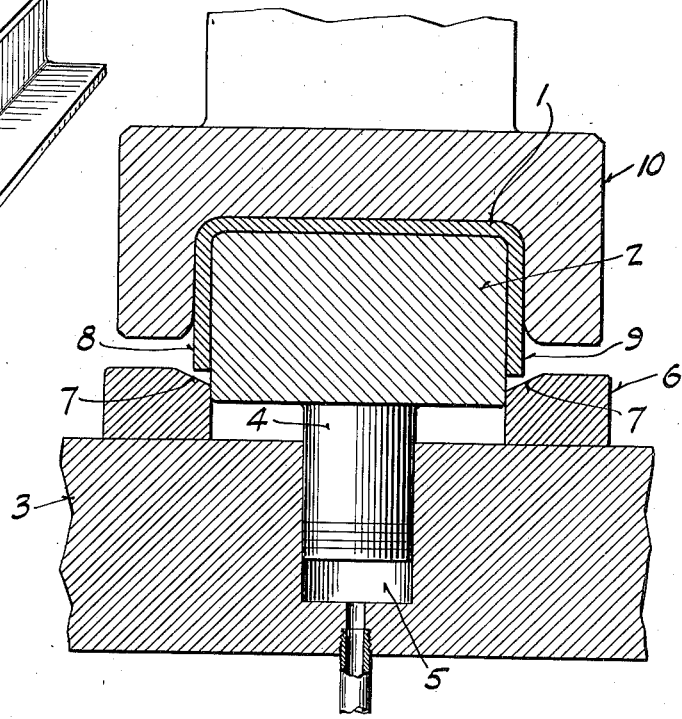
Fig. 2 is a vertical sectional view showing the channel member and the upsetting apparatus disposed in position just prior to the upsetting operation.
Figure 3:
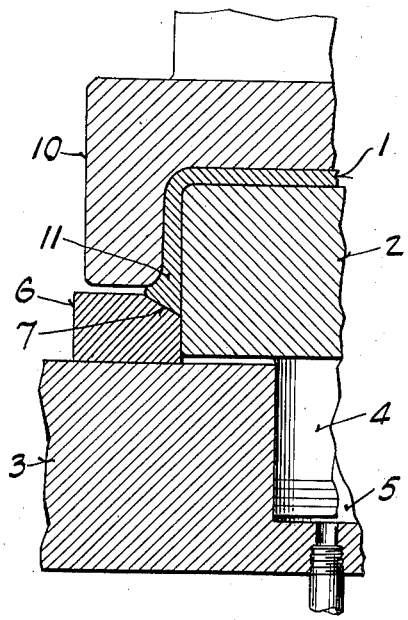
Fig. 3 is a fragmentary vertical sectional view showing a portion of the channel member and the upsetting apparatus after the upsetting operation has been completed.

In carrying out the invention, the channel member 1 is first heated to forming temperature and then disposed on the mandrel 2 with the back of the member exposed, the mandrel having the size and shape of the cavity in the channel member 1.

The mandrel 2 is supported within the bed 3, which may be of any suitable construction, by the piston 4 disposed in a suitable opening extending through the central portion of the bed.

The piston 4 is supported within the bed 3 in any suitable manner, such as by air pressure or spring means to permit the piston to move vertically in the space 5 when the apparatus is in operation.

The die 6 is secured to the top portion of the bed 3 and the inner portion of the die engages the outer surface of the mandrel 2 in such a manner as to permit movement of the mandrel within the die.

Figure 4:
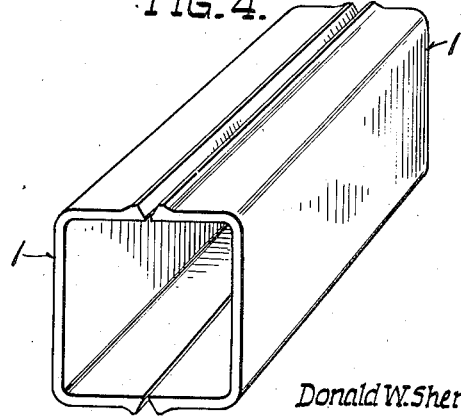
Fig. 4 is a perspective view of two channel members assembled for welding after completion of the upsetting operation.

The upper inner portion of the die 6 has a beveled face 7 to shape the edges 8 and 9 of the channel member 1 when the apparatus is in operation and thereby provide a V-shaped welding groove between two channel members when assembled together edge to edge as illustrated in Fig. 4.

After the channel member 1 is disposed on the mandrel 2 as described, the die punch 10 is advanced toward the mandrel to engage the outer surface of the walls of the channel member 1 and tightly hold the member between the mandrel and punch. The die punch 10 has a cavity substantially the shape of the channel member 1 and the confining of the member 1 between the mandrel 2 and the die punch 10 in the manner described prevents the channel member from buckling or crimping under the upsetting pressures later applied.

In the upsetting operation, the die punch 10 is advanced to engage the back of the channel member 1, the member having preferably been heated to forming temperatures and then disposed on the mandrel 2. The advancing of the punch 10 after it has engaged the channel member depresses the mandrel and forces the metal of the edges 8 and 9 of the channel member to engage the beveled face 7 of the die 6 and this crowds the metal against the mandrel 2. The mandrel retards this directional flow of the metal and forces it to flow outwardly in the opposite direction into a space defined by the beveled face of the die 6 and the inner lower curved edge of the die punch 10. This upsets the metal in the exposed edges 8 and 9 to provide the edges with a greater cross-sectional area than that of the body portion of the member 1. The forming may be carried out in a single step or in a plurality of successive steps.

The upsetting operation also effects some thickening of the metal in the sides of the channel member 1 immediately adjacent the thickened edges 8 and 9. In the channel member 1 illustrated, this thickening of the member is indicated at 11.

In carrying out the invention, several features should be particularly considered. The upsetting of the edges of the member 1 is preferably performed while such member is hot. It is important that the die punch 10 be sufficiently removed from the end of the edges 8 and 9 so that the edges are exposed to properly upset them. At the same time, the channel member 1 should be tightly confined between the mandrel 2 and the die punch 10 to prevent crimping or buckling under the pressure exerted when the edges 8 and 9 are moved against the die 6. The latter should crowd the metal against one of the holding members and the mandrel 2 should be free to move the distance required to complete the upsetting operation.

Although the description has been limited to a channel member, the invention may be applied to a flatly disposed member or to members having other sectional contours. The type of apparatus or machine employed in the invention is relatively unimportant, although good results can be obtained by a machine such as that described.

Various modes of carrying out the invention may be employed within the scope of the accompanying claims.

I claim:

1. The method of upsetting the substantially straight free edge of a member to one side as for welding which comprises, confining the member at a distance removed from the exposed edge to be upset and additionally along one side of said member at the edge to prevent upset laterally toward the confined side, and engaging the edge of the member with a beveled means to crowd the metal toward the confined side thereof to effect an upsetting of the metal in an outwardly disposed thickened portion between the main body of the member and the beveled face of the edge.

2. The method of upsetting the substantially straight free edges of a channel member to the outside for welding which comprises, heating said member to forming temperature, disposing the member on a mandrel with the edges of the member slightly removed from the inner end of said mandrel and having the back thereof exposed, holding the member in tight engagement with the mandrel by means of a die punch engaging the walls of the member to prevent buckling of the same under upsetting pressure and leaving the edges to be upset exposed, and thereafter upsetting the exposed edges of the side walls of the channel member with a die having a beveled approach surface for providing an outwardly extending upset with beveled edges while crowding the metal inwardly toward the mandrel, the mandrel being disposed to carry said channel member toward said die when the die punch is advanced against the back of said member.

3. The method of upsetting the substantially straight free edge of a member to one side for welding which comprises, loosely confining the member at a distance removed from the exposed edge to be upset and additionally confining the member along one side thereof at the edge and for a substantial distance beyond said edge to prevent upset laterally toward the confined side, and engaging the edge of the member with beveled means to crowd the metal toward the confined side thereof to effect an upsetting of the metal in an outwardly disposed thickened beveled edge portion and to thicken the metal in the body of the confined member immediately adjacent the said thickened edge portion.

4. The method of upsetting the free substantially straight and relatively thin metal edge of a sheet metal member substantially to one side thereof without deforming the same, comprising applying upsetting forces initially to the corner of the edge on the side toward the upset in a direction at an angle to the edge, and confining the sheet laterally on its opposite side against component bending forces resulting from said initial pressure during flow of the metal in upsetting.

DONALD W. SHERMAN.